U S011386917B1

(12) United States Patent
Hunt

(10) Patent No.: US 11,386,917 B1
(45) Date of Patent: Jul. 12, 2022

(54) AUDIO-BASED REPETITION COUNTER SYSTEM AND METHOD

(71) Applicant: CROSSROPE, LLC, Raleigh, NC (US)

(72) Inventor: David Hunt, Raleigh, NC (US)

(73) Assignee: Crossrope, LLC, Raleigh, NC (US)

( * ) Notice: Subject to any disclaimer, the term of this patent is extended or adjusted under 35 U.S.C. 154(b) by 0 days.

(21) Appl. No.: 17/143,220

(22) Filed: Jan. 7, 2021

Related U.S. Application Data

(60) Provisional application No. 62/957,857, filed on Jan. 7, 2020.

(51) Int. Cl.
G10L 25/51 (2013.01)
H04R 1/08 (2006.01)
G06F 3/14 (2006.01)

(52) U.S. Cl.
CPC ............... G10L 25/51 (2013.01); H04R 1/08 (2013.01); G06F 3/14 (2013.01)

(58) Field of Classification Search
None
See application file for complete search history.

(56) References Cited

U.S. PATENT DOCUMENTS

| 2006/0064037 | A1* | 3/2006 | Shalon | G16H 20/60 600/586 |
| 2015/0185045 | A1* | 7/2015 | Crawford | G01C 22/006 702/97 |
| 2016/0081625 | A1* | 3/2016 | Kim | H04W 4/80 600/301 |
| 2017/0043217 | A1* | 2/2017 | Lee | G06K 9/00342 |
| 2018/0169474 | A1* | 6/2018 | Reddy | A43B 3/0021 |
| 2020/0001134 | A1* | 1/2020 | Rauhala | G16H 20/60 |
| 2020/0282261 | A1* | 9/2020 | Patil | A63B 24/0003 |

* cited by examiner

Primary Examiner — Paul W Huber
(74) Attorney, Agent, or Firm — Williams Mullen; Andrew R. Shores

(57) ABSTRACT

An audio-based repetition counter system and method are disclosed. In some embodiments, the audio-based repetition sound counter system includes a computing device connected to a microphone. The computing device includes a processor and one or more memory devices, and a repetition counter module is stored on the memory device and executed by the processor. The repetition counter module processes audio data received from a microphone and provide a number of repetitions for one or more series of one or more activities; for example, jumping rope. Further, an audio-based method of counting repetitions for a physical activity is provided.

15 Claims, 8 Drawing Sheets

AUDIO-BASED REPETITION COUNTER SYSTEM AND METHOD

RELATED APPLICATION

The following application claims priority to U.S. Provisional Application No. 62/957,857 filed Jan. 7, 2020, the disclosure of which is incorporated by reference in its entirety.

TECHNICAL FIELD

The presently disclosed subject matter relates generally to systems and methods for counting repetitions during a physical activity and more particularly to an audio-based repetition counter system and method.

BACKGROUND

Jumping rope is a proven exercise for getting fit that people around the world take part in. Jumping rope has grown in popularity as a fitness tool and data-driven users value the ability to count and track the number of jumps they perform. Current systems and/or devices for counting and tracking jumps require certain hardware components with various drawbacks.

One example is an analog counting mechanism with a switch that tallies and displays the jump count. However, this an antiquated counting method that is unable to store data. Another example is a digital counting mechanism that may work with a switch or magnet and displays the count on the jump rope handle. However, this includes costly hardware installed in the jump rope handle. Plus, data is not easily stored or tracked. Yet another example is a digital counting mechanism via a magnetic sensor that sends signal via Bluetooth to a software device. Again, this requires costly extra hardware and requires that handles either have batteries or need cumbersome charging. Another example is a counting mechanism via an external hardware device that is not attached to the rope. This device uses, for example, an accelerometer and communicates with a separate software device. Again, this requires costly extra hardware. Further, accelerometer-based counting senses user up and down movement, not actual rope rotation. Another similar example to count and track jump is via the accelerometer in a smart phone. One drawback in this example is that the user must use a wearable device (e.g., wearing the smart phone) while jumping. Therefore, new approaches are needed for counting and tracking jumps when jumping rope.

SUMMARY

To this end, the present invention provides an audio-based repetition counter system and method. In one embodiment, the audio-based repetition counter system comprises a computing device having a processor and one or more memory devices, a microphone connected to the computing device for receiving audio data and transmitting the audio data to the computing device, and a repetition counter module stored on the memory device and executed by the processor. The repetition counter module is configured to process the audio data received from the microphone and provide a number of repetitions for one or more series of one or more activities. A visual display may be connected to the computing device and configured to display the number of repetitions provided by the repetition counter module.

The computing device may be a mobile computing device, such as a mobile phone, a laptop, a smart watch, a smart speaker or a tablet. The computing device may be connected to a server that is configured to receive the number of repetitions provided by the repetition counter module.

In one embodiment, the repetition counter module is configured to split the audio data into a plurality of windows with each window having a timestamp and calculate a frequency and an amplitude of each window. A timestamp is assigned to each window having a frequency or amplitude equal to or greater than a frequency/amplitude threshold. The repetition counter module provides the number of repetitions based on a number of timestamps within an interval threshold. For example, the interval threshold may comprise a minimum threshold and a maximum threshold, wherein the minimum threshold may be about 0.2 seconds between timestamps and a maximum threshold may be about 1.0 seconds between timestamps. The repetition counter module may also be configured to group the number of repetitions into a series when the number of repetitions exceeds a repetition threshold and exceeds a series interval threshold defined as a time interval between the number of repetitions and another number of repetitions.

In another embodiment, the repetition counter module is configured to recover missing repetitions not detected in the audio data and include those missing repetitions in the number of repetitions provided. For example, the repetition counter module may be configured to recover missing repetitions not detected in the audio data in a series by inserting an extra repetition in the number of repetitions when no timestamp is detected between two timestamps within a time threshold. Another embodiment of the repetition counter module includes the capability to remove outliers from the audio data.

Another aspect of the present disclosure is directed to a method for counting repetitions in an activity. In one embodiment, the method comprises receiving audio data from a microphone during the activity, recording the audio data to a computing device, and processing the audio data to provide a number of repetitions for the activity. The method may further include displaying the number of repetitions on a visual display.

In one embodiment, processing the audio data comprises splitting the audio data into a plurality of windows with each window having a timestamp, calculating a frequency and an amplitude for each window, assigning a timestamp for each window having a frequency or amplitude equal to or greater than a frequency/amplitude threshold, and providing the number of repetitions based on a number of timestamps within an interval threshold. Processing the audio data may further include grouping the number of repetitions into a series when the number of repetitions exceeds a repetition threshold and exceeds a series interval threshold. The series interval threshold is defined as a time interval between the number of repetitions and another number of repetitions.

In another embodiment, the method further comprises recovering missing repetitions not detected in the audio data and include the missing repetitions in the number of repetitions provided. For example, the missing repetitions not detected in the audio data may be recovered by inserting an extra repetition in the number of repetitions when no timestamp is detected between two timestamps within a time threshold. The method may further comprise removing outliers from the audio data.

BRIEF DESCRIPTION OF THE DRAWINGS

Figure 1:
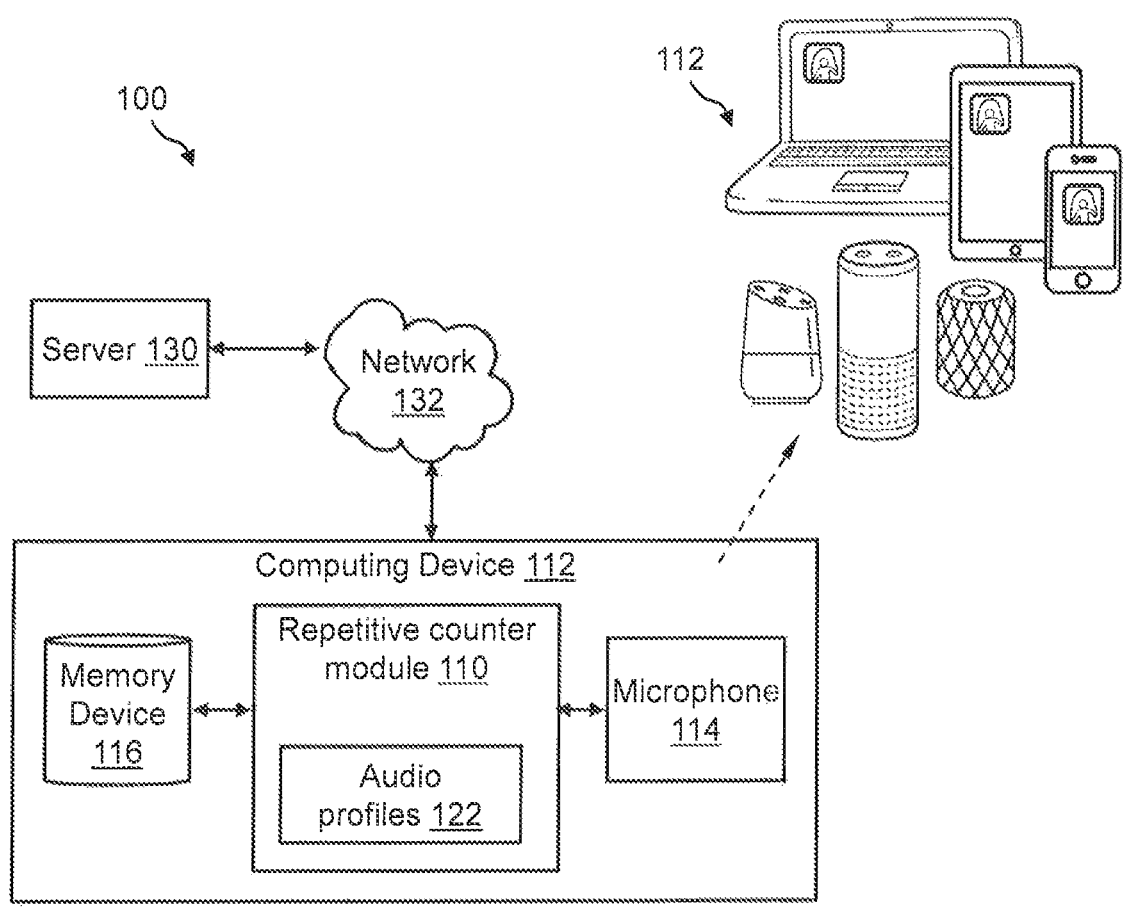
Figure 1:
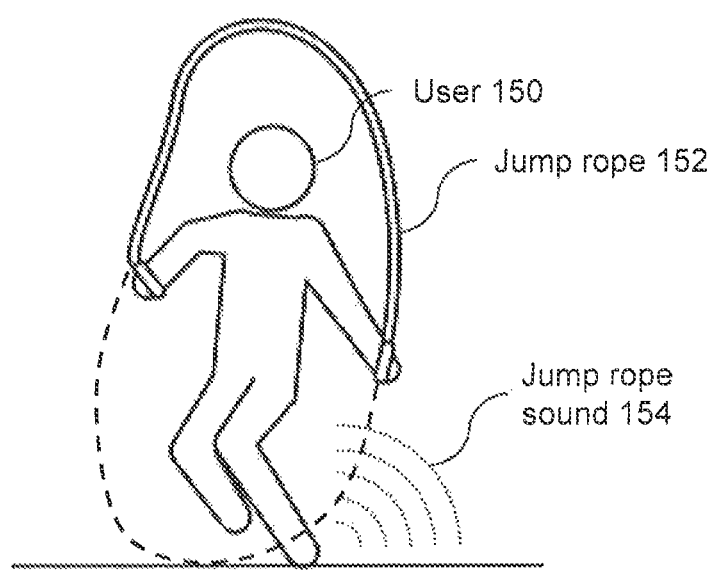
Figure 2:
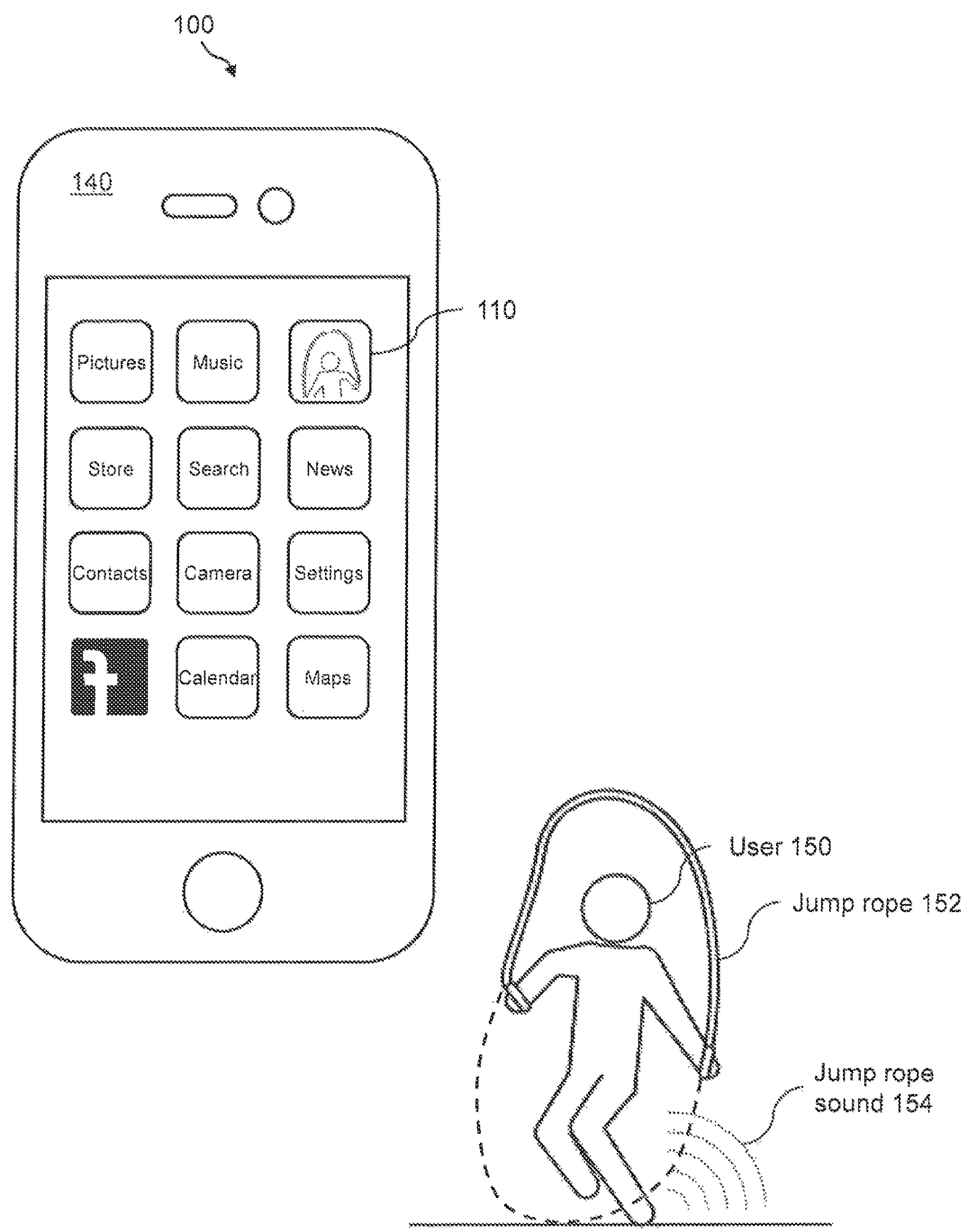
Figure 3A:
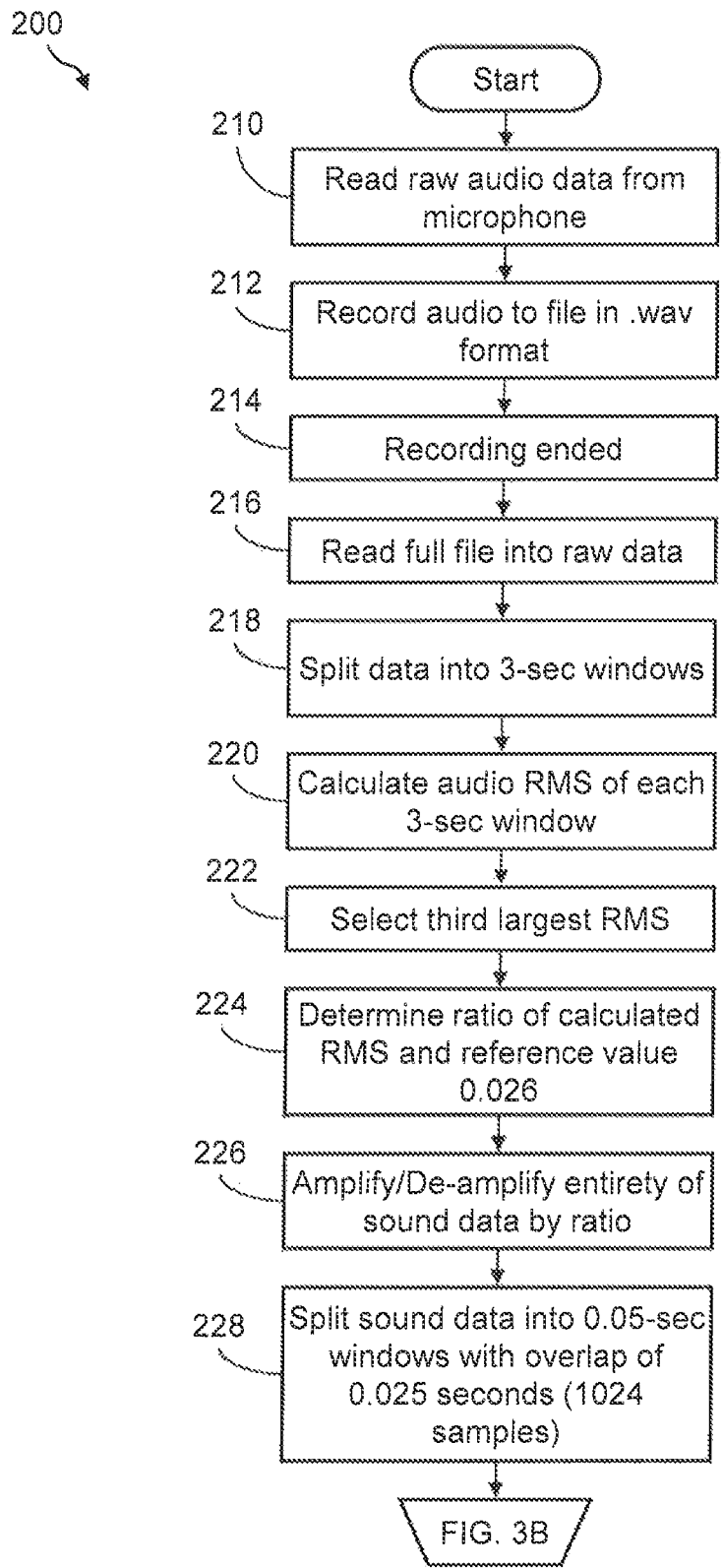
Figure 3B:
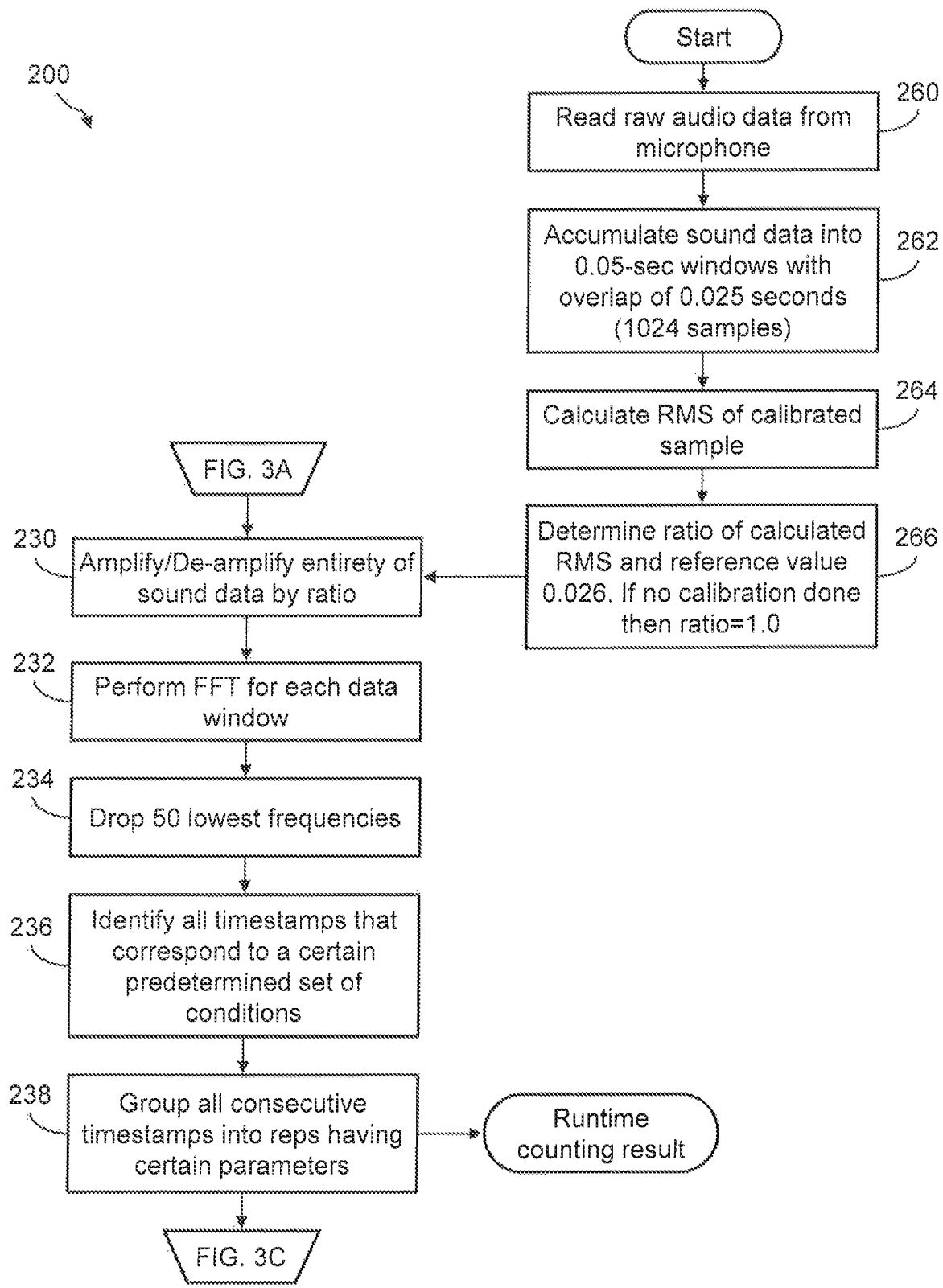
Figure 3C:
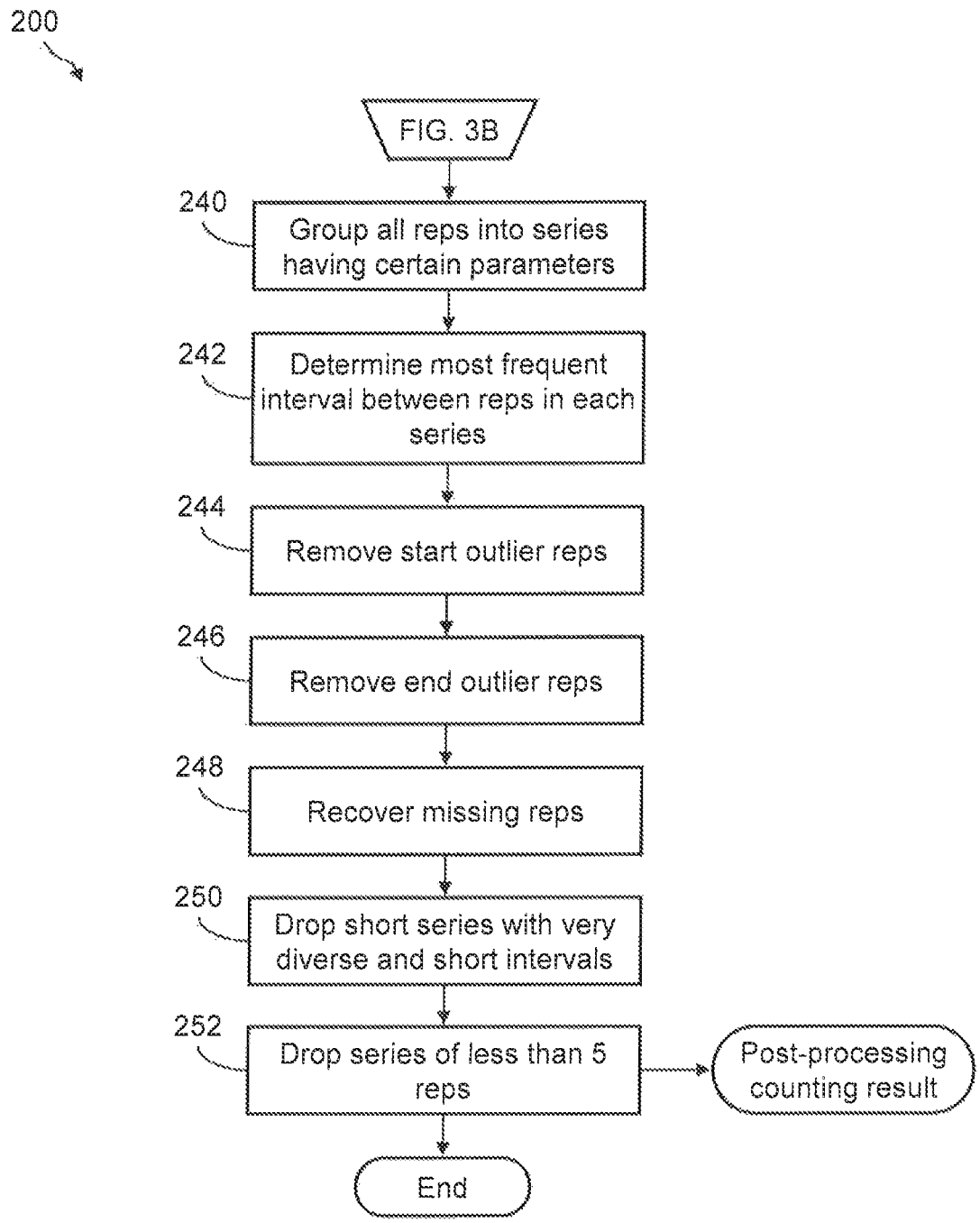

Having thus described the presently disclosed subject matter in general terms, reference will now be made to the accompanying drawings, which are not necessarily drawn to scale, and wherein:

FIG. 1 illustrates a block diagram of an example of the presently disclosed audio-based repetition counter system;

FIG. 2 illustrates a block diagram of an example of the presently disclosed audio-based repetition counter system that is implemented using a mobile phone; and FIG. 3A, FIG. 3B, and FIG. 3C illustrate a flow diagram for one embodiment of a repetition counter module of the presently disclosed audio-based repetition counter system configured to detect and count jump rope repetitions.

Figure 4:
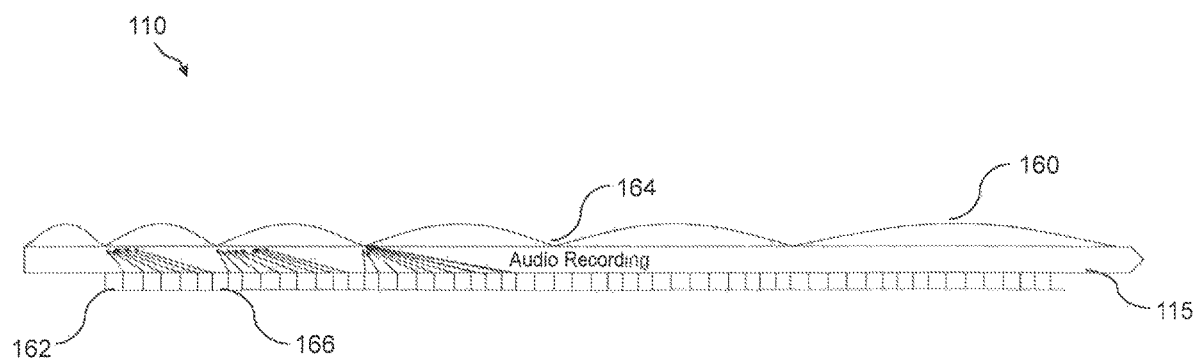

FIG. 4 is a flow diagram for one embodiment of a repetition counter module having a full post-processing module and a short post-processing module.

Figure 5A:
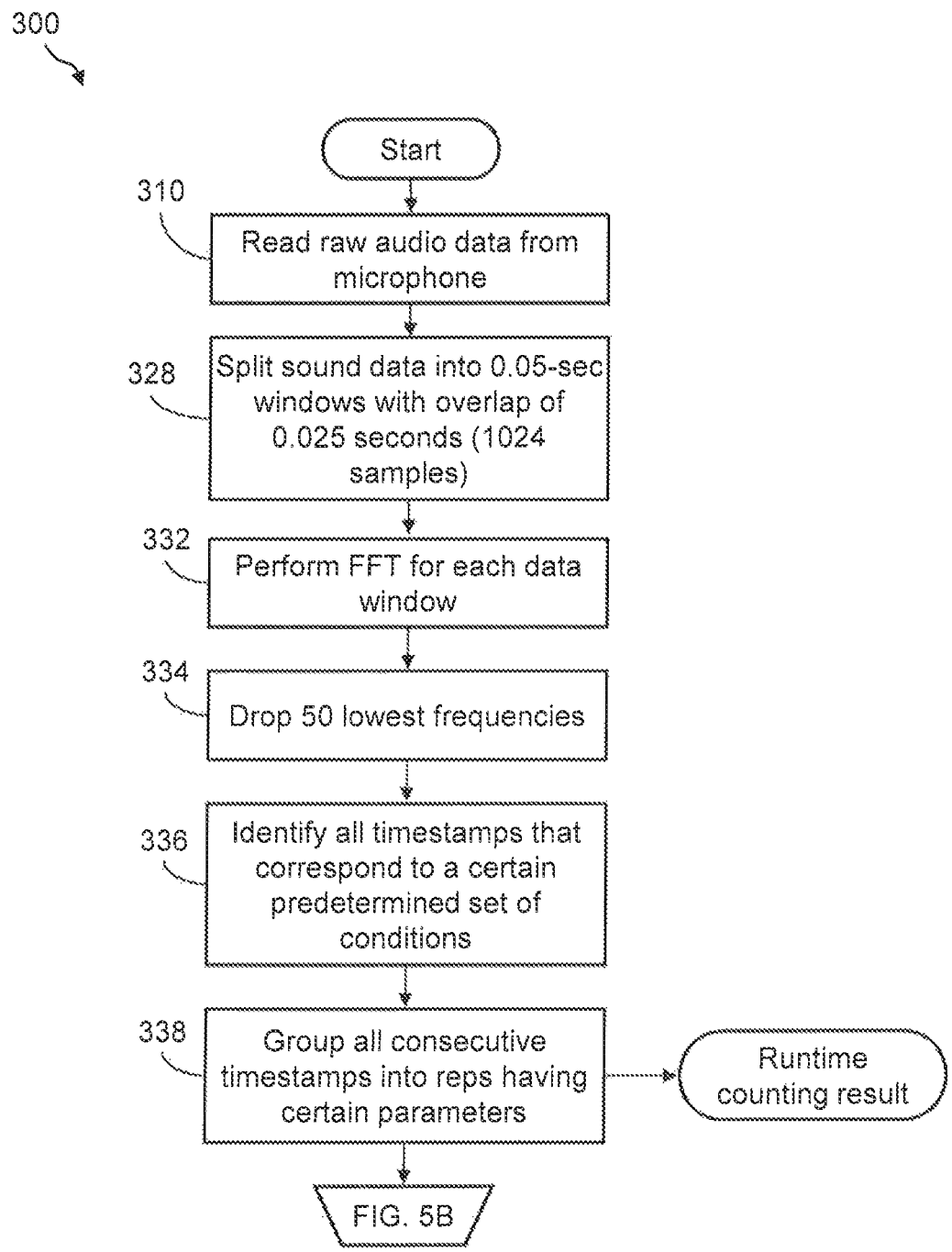
Figure 5B:
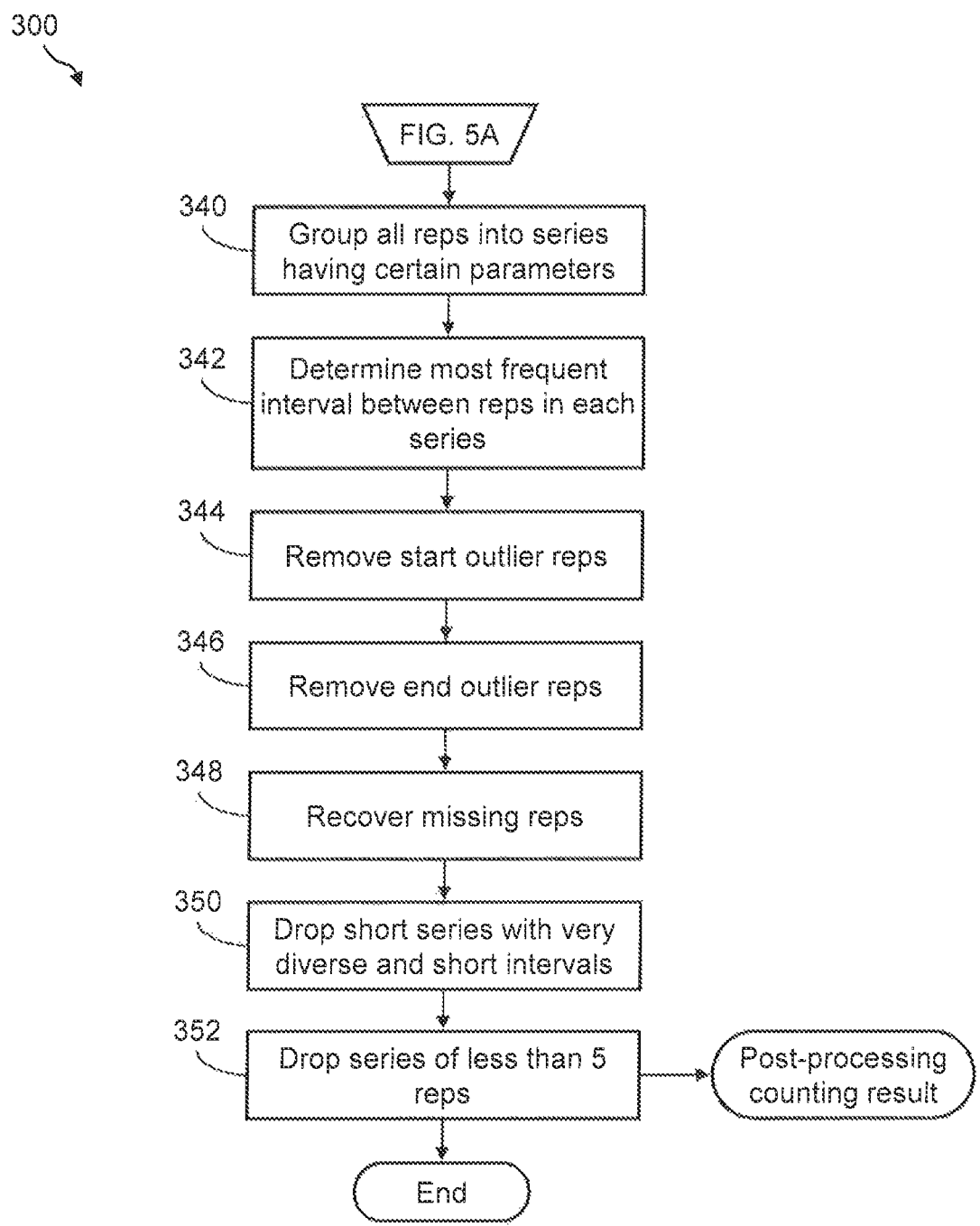

FIG. 5A and FIG. 5B illustrate a flow diagram of a method for counting repetitions according to another embodiment of a repetition counter module.

DETAILED DESCRIPTION

The presently disclosed subject matter now will be described more fully hereinafter with reference to the accompanying drawings, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated Drawings. Therefore, it is to be understood that the presently disclosed subject matter is not to be limited to the specific embodiments disclosed and that modifications and other embodiments are intended to be included within the scope of the appended claims.

An audio-based repetition counter system and method are provided. In some embodiments, the presently disclosed audio-based repetition counter system and method may include a computing device having one or more memory devices and a processor. A microphone is connected to the computing device for receiving audio data and transmitting the audio data to the computing device. The microphone may be wired or wirelessly connected to the computing device, or may be integrated within the housing of the computing device. The microphone may be a stand-alone device or part of another computing device such as a smart speaker. The computing device includes a repetition counter module stored on the memory device and executed by the processor. The repetition counter module is configured to process the audio data received from the microphone and provide a number of repetitions for one or more series of one or more activities.

In some embodiments, the computing device may be, for example, a voice assistance platform, a mobile phone or smartphone, a tablet device, a laptop computer, a desktop computer, and the like.

In some embodiments, the repetition counter module enables the microphone to properly filter audio profiles and correctly detect a certain type of audio event and to detect what is a proper repetition of that audio event.

In some embodiments, the presently disclosed audio-based repetition counter system and method is used in a jump rope activity in which the repetition counter module uses a jump rope audio profile to process audio data received from a microphone and to count and track jump rope repetitions.

In some embodiments, the repetition counter module enables the microphone to properly filter audio profiles and correctly detect a jump rope audio event and to detect what is a proper repetition of the jump rope repetitions.

In some embodiments, the presently disclosed audio-based repetition counter system and method is installed and running on a mobile phone for counting and tracking jump rope repetitions and wherein the mobile phone is separate from the user (i.e., is not required to be worn by the user) because jump detection may be done by processing audio data received by the microphone of the mobile phone. That is, the presently disclosed audio-based repetition counter system and method relies on sound detection not motion detection.

In some embodiments, the repetition counter module of the repetitive sound software application of the presently disclosed audio-based repetition counter system can display in real time the current repetition count.

In some embodiments, the presently disclosed audio-based repetition counter system connects to a network.

Further, a process of using the repetition counter module of the presently disclosed audio-based repetition counter system to count and track jumps in a jump rope activity is provided.

The presently disclosed audio-based repetition counter system and method is described hereinbelow in the context of a jump rope activity for detecting and counting jumps. However, this is exemplary only. The presently disclosed audio-based repetition counter system and method may be used to count repetitive sound events of any type and/or source.

Referring now to FIG. 1 is a block diagram of an example of the presently disclosed audio-based repetition counter system 100. Audio-based repetition counter system 100 may include a repetition counter module 110 running on a computing device 112. In one embodiment, computing device 112 may be any type of smart device and/or system that has a microphone. For example, computing device 112 may be a voice assistance platform, such as, but not limited to, Amazon Echo, Google Home, Sonos Beam, Sonos One, JBL Link 10, Sonos Move, Apple HomePod, GoogleNest Mini, and the like. In another example, computing device 112 may be a mobile phone or smartphone (e.g., iPhone or Android phone) or a tablet device (e.g., iPad or Android tablet). In yet another example, computing device 112 may be a laptop or desktop computer.

Additionally, repetition counter module 110 may be in communication with a smart speaker 114 that has a built-in microphone (not shown). Further, repetition counter module 110 has access to a certain amount of memory device 116.

Repetition counter module 110 may be used to manage the overall operations of audio-based repetition counter system 100. Repetition counter module 110 may be implemented, for example, as a browser-based application, a desktop application, a mobile app, an application program interface (API), and the like, depending on the environment in which it is running.

Optionally, computing device 112 may be connected to a centralized server 130 via a network 132. Server 130 can be any networked computing configuration. For example, audio-based repetition counter system 100 may support a cloud computing environment. In a cloud computing environment, server 130 is the cloud server. Network 132 may be, for example, any local area network (LAN), wide area network (WAN), or cellular network for connecting to the Internet.

Repetition counter module 120 of repetition counter module 110 is used to enable the microphone to properly filter audio profiles 122 and correctly detect what is a proper repetition of the sound of interest.

FIG. 1 shows one example of an audio-based repetition counter system wherein a user 150 is performing a jump rope activity with a jump rope 152. With each slap of the jump rope striking a surface (e.g., hitting the floor) a certain sound is produced that can be correlated to a "jump rope event" by repetition counter module 110. That is, the microphone 114 picks up the sound of each jump (e.g., jump rope sound 154). Then, the repetition counter module 110 processes the audio data from the microphone 114 and detects the jump rope activity through a series of repetitive jump rope sounds 154 with high accuracy.

Referring now to FIG. 2 is a block diagram of an example of the presently disclosed audio-based repetition counter system 100 that is implemented using a mobile phone. In this example, repetition counter module 110 is installed and running on a smartphone 140 (e.g., iPhone or Android phone). In this example, the repetition counter module 110 uses the microphone of smartphone 140 to detect the repetitions based on audio data from the jump rope sound 154. Further, in this example, user 150 can see the count tally on the display of smartphone 140 in near real-time as they jump.

Referring still to FIG. 1 and FIG. 2, the audio-based repetition counter system 100 can be used to count jump rope repetitions, track workouts, play games, share work outs with others (e.g., by connecting the computing device to a server and uploading data), and the like. Further, the benefits of using audio-based repetition counter system 100 to count jump rope repetitions may include, but are not limited to, the following:
(1) There is no associated hardware cost as repetition counter module 110 is an application that can be installed on any existing smart device of a user;
(2) There is no requirement of a motion sensor (e.g., mobile phone accelerometer) to be worn or held by the user in order to register a count;
(3) There is no requirement of a motion sensor to be installed in the handle of a jump rope in order to register a count;
(4) There is no requirement of a separate counting device that requires batteries or needs to be charged (aside from the existing smart device); and
(5) The user can see the count tally in near real-time as they jump.

Referring now to FIG. 3A, FIG. 3B, and FIG. 3C is a flow diagram of one example of a method 200 of counting repetitions for an activity using a repetition counter module 110 that relies on sound detection in lieu of motion detection.

Method 200 is described hereinbelow in the context of a jump rope activity for detecting and counting jump rope repetitions. However, this is exemplary only. Method 200 may be adapted to count repetitive sound events of various types and/or sources. Similarly, the values and thresholds provided below are only examples based on an audio profile adapted for jumping rope, and may be modified in other embodiments (e.g., the repetition counter module may include additional audio profiles with different thresholds adapted for other types of activities). Method 200 may include, but is not limited to, the following steps.

At a step 210, the raw audio data is read (captured) from the microphone. For example, read raw audio data with sample rate=44100, channel=1, and audio format=linear PCM. Method 200 proceeds to step 212.

At a step 212, the raw audio data is recorded to an audio file in .wav format. Method 200 proceeds to step 214.

At a step 214, the recording ends. Method 200 proceeds to step 216.

At a step 216, the full file is read into raw data. Method 200 proceeds to step 218.

At a step 218, the data is split into 3-sec windows. Method 200 proceeds to step 220.

At a step 220, the audio root mean square (RMS) of each 3-sec window is calculated. Method 200 proceeds to step 222.

At a step 222, the third largest RMS is identified and selected. Method 200 proceeds to step 224.

At a step 224, the ratio of the calculated RMS and a reference value 0.026 is determined. Method 200 proceeds to step 226.

At a step 226, the entirety of the sound data is amplified and/or de-amplified by the ratio determined in step 224. Method 200 proceeds to step 228.

At a step 228, the sound data is split into 0.05-sec windows with overlap of 0.025 seconds (1024 samples). Method 200 proceeds to step 230.

At a step 230, the entirety of the sound data is amplified and/or de-amplified by the ratio determined in step 224. Method 200 proceeds to step 232.

At a step 232, a fast Fourier transform (FFT) is performed for each data window. Method 200 proceeds to step 234.

At a step 234, the 50 lowest frequencies are dropped. Method 200 proceeds to step 236.

At a step 236, all timestamps that correspond to a certain predetermined set of conditions are identified. For example, identify all timestamps that correspond to the following conditions:
(1) OR mid FFT value is more than twice larger than on previous step;
(2) OR count of amplitudes larger than 0.4 exceeds 600;
(3) OR count of amplitudes larger than mid value exceeds 200;
(4) AND mid value exceeds 0.4.
Method 200 proceeds to step 238.

At a step 238, all consecutive timestamps are grouped into repetitions having certain parameters. For example, all consecutive timestamps are grouped into repetitions as follows:
(1) minimum interval between repetitions is 0.2 seconds;
(2) maximum interval between repetitions is 1.0 seconds;
(3) others are skipped.
Method 200 proceeds to step 240.

At a step 240, all repetitions are grouped into series having certain parameters. For example, all repetitions are grouped into series as follows:
(1) series should have at least 4 repetitions;
(2) interval between series is more than 2 seconds;
(3) others are skipped.
Method 200 proceeds to step 242.

At a step 242, the most frequent interval between repetitions in each series is determined. Method 200 proceeds to step 244.

At a step 244, the start outlier repetitions are removed. For example, search 3 starting repetitions of each series to determine whether they have interval greater than 2.5 of most frequent series interval. If yes, drop repetitions occurring before it. If no, keep reps. Method 200 proceeds to step 246.

At a step 246, the end outlier repetitions are removed. For example, search 5 ending repetitions of each series to determine whether they have interval greater than 2.5 of most frequent series interval. If yes, drop repetitions occurring after it. If no, keep reps. Method 200 proceeds to step 248.

At a step 248, the missing repetitions are recovered. For example, the missing repetitions are recovered:
(1) if series has more than 15 repetitions;
(2) if interval between two repetitions is in range between 1.5 and 2.5 of most frequent interval—insert extra repetition in this interval;
(3) if interval between two repetitions is in range between 2.5 and 3.5 of most frequent interval—insert two extra repetitions in this interval;

Method 200 proceeds to step 250.

At a step 250, any short series with very diverse and short intervals is dropped. For example, (1) drop any series less than 12 repetitions; and (2) drop any series with high diversity between intervals. Method 200 proceeds to step 252.

At a step 252, any series of less than 5 repetitions is dropped. Method 200 ends.

At a step 260, the raw audio data is read (captured) from the microphone. For example, read raw audio data with sample rate=44100, channel=1, and audio format=linear PCM. Method 200 proceeds to step 262.

At a step 262, the sound data is accumulated into 0.05-sec windows with overlap of 0.025 seconds (1024 samples). Method 200 proceeds to step 264.

At a step 264, the RMS of the calibrated sample is calculated. Method 200 proceeds to step 266.

At a step 266, the ratio of the calculated RMS and a reference value 0.026 is determined. If no calibration is performed, then ratio=1.0. Method 200 proceeds to step 230.

In method 200, the steps 210 through 252 are performed in order and the end of step 252 produces the "Post-processing counting result."

In method 200, the steps 260, 262, 264, 266, 230, 232, 234, 236, 238 are performed in order and the end of step 238 produces the "Runtime counting result."

According to another embodiment, the repetition counter module 110 may include a full post-processing module 160 and a short post-processing algorithm 162 as seen in FIG. 4. The full post-processing module 160 takes as input the entire audio data 115 recorded since the beginning of a session. The full post-processing module 160 may be configured to process the audio data 115 after an iteration 164. The iteration 164 may be defined by a time duration or after a number of repetitions counted from the short post-processing module 162. For example, the iteration 164 may be defined as every 5 seconds of a session. The iteration 164 may be fixed or subject to change as a session continues.

The short post-processing module 162 operates sequentially one after another and takes as input a portion of the audio data 115 that the full post-processing module 160 has not processed. In one embodiment, the short post-processing module 162 occurs first for a new set of audio data 115 before full post-processing is performed. The short post-processing module 162 operates at shorter intervals 166 to the iterations 164 of the full post-processing module 160. For example, the interval 166 may be defined as every 3 seconds of a session.

The short post-processing module 162 provides a real-time (or near real-time) count of the number of repetitions whereas the full post-processing module 160 provides a more accurate repetition count since the full post-processing module 160 utilizes a larger data set. The full post-processing module 160 may also be used to verify and correct any counting errors produced by the short post-processing module 162.

Referring now to FIG. 5A, FIG. 5B, and FIG. 5C is a flow diagram of one example of a method 300 of counting repetitions that may be utilized by the full post-processing module 160 and the short post-processing module 162.

Method 300 is described hereinbelow in the context of a jump rope activity for detecting and counting jump rope repetitions. However, this is exemplary only. Method 300 may be adapted to count repetitive sound events of various types and/or sources. Similarly, the values and thresholds provided below are only examples based on an audio profile adapted for jumping rope, and may be modified in other embodiments (e.g., the repetition counter module may include additional audio profiles with different thresholds adapted for other types of activities). Method 300 may include, but is not limited to, the following steps.

At a step 310, the raw audio data is read (captured) from the microphone. For example, read raw audio data with sample rate=44100, channel=1, and audio format=linear PCM. Method 200 proceeds to step 328.

At a step 328, the sound data is split into 0.05-sec windows with overlap of 0.025 seconds (1024 samples). Method 300 proceeds to step 332.

At a step 332, a fast Fourier transform (FFT) is performed for each data window. Method 300 proceeds to step 334.

At a step 334, the 50 lowest frequencies are dropped. Method 300 proceeds to step 336.

At a step 336, all timestamps that correspond to a certain predetermined set of conditions are identified. For example, identify all timestamps that correspond to the following conditions:
(1) OR mid FFT value is more than twice larger than on previous step;
(2) OR count of amplitudes larger than 0.4 exceeds 600;
(3) OR count of amplitudes larger than mid value exceeds 200;
(4) AND mid value exceeds 0.4.

Method 300 proceeds to step 338.

At a step 338, all consecutive timestamps are grouped into repetitions having certain parameters. For example, all consecutive timestamps are grouped into repetitions as follows:
(1) minimum interval between repetitions is 0.2 seconds;
(2) maximum interval between repetitions is 1.0 seconds;
(3) others are skipped.

Method 300 proceeds to step 340.

At a step 340, all repetitions are grouped into series having certain parameters. For example, all repetitions are grouped into series as follows:
(1) series should have at least 4 repetitions;
(2) interval between series is more than 2 seconds;
(3) others are skipped.

Method 300 proceeds to step 342.

At a step 342, the most frequent interval between repetitions in each series is determined. Method 300 proceeds to step 344.

At a step 344, the start outlier repetitions are removed. For example, search 3 starting repetitions of each series to determine whether they have interval greater than 2.5 of most frequent series interval. If yes, drop repetitions occurring before it. If no, keep reps. Method 300 proceeds to step 346.

At a step 346, the end outlier repetitions are removed. For example, search 5 ending repetitions of each series to determine whether they have interval greater than 2.5 of most frequent series interval. If yes, drop repetitions occurring after it. If no, keep reps. Method 300 proceeds to step 348.

At a step 348, the missing repetitions are recovered. For example, the missing repetitions are recovered:
(1) if series has more than 15 repetitions;
(2) if interval between two repetitions is in range between 1.5 and 2.5 of most frequent interval—insert extra repetition in this interval;
(3) if interval between two repetitions is in range between 2.5 and 3.5 of most frequent interval—insert two extra repetitions in this interval;

Method 300 proceeds to step 350.

At a step 350, any short series with very diverse and short intervals is dropped. For example, (1) drop any series less than 12 repetitions; and (2) drop any series with high diversity between intervals. Method 300 proceeds to step 352.

At a step 352, any series of less than 5 repetitions is dropped. Method 300 ends.

At a step 360, the raw audio data is read (captured) from the microphone. For example, read raw audio data with sample rate=44100, channel=1, and audio format=linear PCM. Method 300 proceeds to step 362.

At a step 362, the sound data is accumulated into 0.05-sec windows with overlap of 0.025 seconds (1024 samples). Method 300 proceeds to step 364.

At a step 364, the RMS of the calibrated sample is calculated. Method 300 proceeds to step 366.

At a step 366, the ratio of the calculated RMS and a reference value 0.026 is determined. If no calibration is performed, then ratio=1.0. Method 300 proceeds to step 330.

In method 300, the steps 310 through 352 are performed in order and the end of step 352 produces the "Post-processing counting result."

In method 300, the steps 360, 362, 364, 366, 330, 332, 334, 336, 338 are performed in order and the end of step 338 produces the "Runtime counting result."

In some embodiments, the method may further include a calibration step for determining an optimal Fourier transformed spectrogram for a particular computing device 112 that the repetition counter module 110 is installed onto. For example, the calibration step may request the user to make about 10 jumps to calibrate the appropriate transformation so the percussive amplitude displays in the range for max effectiveness for the logic rules.

Following long-standing patent law convention, the terms "a," "an," and "the" refer to "one or more" when used in this application, including the claims. Thus, for example, reference to "a subject" includes a plurality of subjects, unless the context clearly is to the contrary (e.g., a plurality of subjects), and so forth.

Throughout this specification and the claims, the terms "comprise," "comprises," and "comprising" are used in a non-exclusive sense, except where the context requires otherwise. Likewise, the term "include" and its grammatical variants are intended to be non-limiting, such that recitation of items in a list is not to the exclusion of other like items that can be substituted or added to the listed items.

For the purposes of this specification and appended claims, unless otherwise indicated, all numbers expressing amounts, sizes, dimensions, proportions, shapes, formulations, parameters, percentages, quantities, characteristics, and other numerical values used in the specification and claims, are to be understood as being modified in all instances by the term "about" even though the term "about" may not expressly appear with the value, amount or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the presently disclosed subject matter. For example, the term "about," when referring to a value can be meant to encompass variations of, in some embodiments ±100%, in some embodiments ±50%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

Although the foregoing subject matter has been described in some detail by way of illustration and example for purposes of clarity of understanding, it will be understood by those skilled in the art that certain changes and modifications can be practiced within the scope of the appended claims.

That which is claimed:

1. An audio-based repetition counter system comprising:
   a computing device having a processor and one or more memory devices,
   a microphone connected to the computing device for receiving audio data and transmitting the audio data to the computing device, and
   a repetition counter module stored on the memory device and executed by the processor, the repetition counter module configured to process the audio data received from the microphone and provide a number of repetitions for one or more series of one or more activities;
   wherein the repetition counter module is configured to split the audio data into a plurality of windows with each window having a timestamp, calculate a frequency and an amplitude of each window, assign a timestamp for each window having a frequency or amplitude equal to or greater than a frequency/amplitude threshold, and provide the number of repetitions based on a number of timestamps within an interval threshold.

2. The audio-based repetition counter system according to claim 1 further including a visual display connected to the computing device and configured to display the number of repetitions provided by the repetition counter module.

3. The audio-based repetition counter system according to claim 1, wherein the computing device is a mobile computing device selected from the group comprising a mobile phone, a laptop, a smart watch, a smart speaker and a tablet.

4. The audio-based repetition counter system according to claim 1, wherein the computing device is connected to a server configured to receive the number of repetitions provided by the repetition counter module.

5. The audio-based repetition counter system according to claim 1, wherein the interval threshold comprises a minimum threshold of about 0.2 seconds between timestamps and a maximum threshold of about 1.0 seconds between timestamps.

6. The audio-based repetition counter system according to claim 1, wherein the repetition counter module is configured to group the number of repetitions into a series when the number of repetitions exceeds a repetition threshold and exceeds a series interval threshold defined as a time interval between the number of repetitions and another number of repetitions.

7. The audio-based repetition counter system according to claim 1, wherein the repetition counter module is configured to recover missing repetitions not detected in the audio data and include the missing repetitions in the number of repetitions provided.

8. The audio-based repetition counter system according to claim 7, wherein the repetition counter module is configured to recover missing repetitions not detected in the audio data in a series by inserting an extra repetition in the number of repetitions when no timestamp is detected between two timestamps within a time threshold.

9. The audio-based repetition counter system according to claim 1, wherein the repetition counter module is configured to remove outliers from the audio data.

10. A method for counting repetitions during a physical activity comprising:
receiving audio data from a microphone during an activity,
recording the audio data to a computing device,
processing the audio data to provide a number of repetitions for the activity;
splitting the audio data into a plurality of windows with each window having a timestamp,
calculating a frequency and an amplitude for each window,
assigning a timestamp for each window having a frequency or amplitude equal to or greater than a frequency/amplitude threshold, and
providing the number of repetitions based on a number of timestamps within an interval threshold.

11. The method according to claim 10 further including displaying the number of repetitions on a visual display.

12. The method according to claim 9 further comprising grouping the number of repetitions into a series when the number of repetitions exceeds a repetition threshold and exceeds a series interval threshold defined as a time interval between the number of repetitions and another number of repetitions.

13. The method according to claim 9 further comprising recovering missing repetitions not detected in the audio data and include the missing repetitions in the number of repetitions provided.

14. The method according to claim 13, wherein recovering missing repetitions not detected in the audio data comprises inserting an extra repetition in the number of repetitions when no timestamp is detected between two timestamps within a time threshold.

15. The method according to claim 9 further comprising removing outliers from the audio data.

* * * * *